US006980788B2

(12) United States Patent
Peeples

(10) Patent No.: US 6,980,788 B2
(45) Date of Patent: Dec. 27, 2005

(54) COOLER CHEST WITH RADIO

(76) Inventor: Jason W. Peeples, 1696 Walterboro Hwy., Varnville, SC (US) 29944

( * ) Notice: Subject to any disclaimer, the term of this patent is extended or adjusted under 35 U.S.C. 154(b) by 345 days.

(21) Appl. No.: 10/078,305

(22) Filed: Feb. 19, 2002

(65) Prior Publication Data
US 2003/0157893 A1 Aug. 21, 2003

(51) Int. Cl.⁷ .............................. H04B 1/08
(52) U.S. Cl. .............. 455/347; 455/344; 455/350; 455/351; 455/90.1; 455/90.2; 455/90.3; 62/457.1; 62/457.7; 381/118
(58) Field of Search .............. 455/90.1, 90.2, 455/90.3, 344, 347, 350, 351; 62/457.1, 457.7; 381/118

(56) References Cited

U.S. PATENT DOCUMENTS 4,700,395 A 10/1987 Long
4,817,191 A 3/1989 Adams
D305,397 S 1/1990 Balius
4,939,912 A 7/1990 Leonovich, Jr.
D321,515 S 11/1991 Harris
D334,868 S 4/1993 Lau Woon
5,235,822 A * 8/1993 Leonovich, Jr. ............ 62/457.2
5,447,041 A * 9/1995 Piechota .................... 62/457.7
5,781,853 A 7/1998 Johnson
5,979,175 A * 11/1999 Ellison ...................... 62/457.7
6,305,185 B1 10/2001 Sloan

* cited by examiner

Primary Examiner—Nick Corsaro
Assistant Examiner—Sanh Phu
(74) Attorney, Agent, or Firm—Stephen R. Chapman

(57) ABSTRACT

A resonance chamber with two or more speakers positioned in the lid of a commercially available cooler chest and electrically connected to a radio circuit board also positioned in the lid and powered by a solar panels or a combination of solar panels and batteries. All elements are water proofed and positioned for protection during normal use of the cooler and positioned so as to not disrupt the normal use of the cooler.

4 Claims, 5 Drawing Sheets

COOLER CHEST WITH RADIO

FIELD OF THE INVENTION

This invention is directed towards radios components powered by solar panels and positioned in the lid unit of various types of containers used for recreational and other purposes thereby enhancing the utility of the containers.

BACKGROUND OF THE INVENTION

For decades, the radio has been a source of entertainment, a significant element of many forms of recreation and a source of company for individuals in remote settings. The portable radio has evolved from a cumbersome, frequently fragile and less than dependable novelty to small, energy efficient, sturdy, dependable free standing units that accompany thousands as a significant part of outdoor recreational activities, including camping, picnicking, and similar, activities. In addition to size reduction and improved dependability plus transistor technology and the growth of circuit board technology, and the continued improvement of batteries, all have contributed to the seemingly ubiquitous presence of the portable radio.

Portable radios and any of a wide variety of portable coolers or ice chests are functionally unrelated; however, both appliances commonly are included as virtually essential equipment. The radio and the cooler most commonly are found with the people. Combining these devices may be of practical convenience so long as the utility of each is maintained without burdening either.

Cooler chests and similar devices have been variously modified to include radio receivers or otherwise function as elements of a sound system. Generally modifications have involved the chest or body portion of the cooler, or both the lid portion and the body, and modifications either expose functional components of the radio to mechanical or environmental damage or require significant modifications to commercially available cooler units.

U.S. Pat. No. 4,700,395 to Long discloses positioning speaker units protruding from the external walls of a commercially available picnic cooler. The disclosure includes attaching an independent radio receiver to the exterior of the cooler lid. U.S. Pat. No. 4,817,191 to Adams describes securing a complete radio receiver unit, including speakers, in a recess formed in the exterior wall of a cooler chest, with components of the unit protruding from the surface of the wall. The invention is complicated by the inclusion of a battery pack positioned in the lid and positioned to counterbalance the radio. U.S. Pat. No. 4,939,912 to Leonovich also describes a radio or other electrical device such as tape casette player positioned in and protruding from the wall of a cooler chest. Like U.S. Pat. No. 4,817,191, the '912 patent includes antenna wiring extending from the radio unit in the cooler base into a moveable lid. In addition, the '912 patent suggests solar power units as sources of electrical power, but fails to disclose any positioning of such units or the size required. U.S. Pat. No. 6,305,185 to Sloan describes a cooler chest in which a radio system is positioned in the walls of a cooler chest. Solar energy panels are placed on the surface of the lid and connected through the lid to the radio unit. The disclosure includes provisions for connection to an external power source. U.S. Pat. No. 5,447,041 to Piechota describes a cooler lid modified to house a radio. A folding device allows a radio to be supported above the surface of the cooler lid for use and as a result of a folding mechanism to be stored in a compartment in the cooler lid when not in use. U.S. Pat. No. D305,397 to Balius and U.S. Pat. No. D321,515 to Harris describe placement of radios in one side of the chest portion of a commercially available cooler chest with elements of the radio protruding from the surface. U.S. Pat. No. D334,868 to Woon describes a cooler with a radio receiver unit positioned in the side wall of the cooler chest and speakers placed in a separate compartment below the chest.

Accordingly there remains room in the art for combinations of portable radios and coolers that position the entire radio unit and power supply in one component of the cooler thereby eliminating wiring between the chest and lid components, with the entire unit positioned within a component of the cooler thereby reducing potential damage, maximizing protection from dirt and moisture, providing a flexible power source, and minimizing effects on the structure and normal use of the cooler.

SUMMARY OF THE INVENTION

It is one aspect of the invention to utilize the lid or closure portion of commercially available cooler chests to house a complete radio receiver unit and power source. It is a second purpose of the invention that the radio and all related components and controls be sealed and maintained in a water proof condition. It is a third aspect of the invention that parts of the radio and related components are at least flush with the surfaces of the lid and are protected from accidental damaged. It is another aspect of the invention that the normal use of the cooler chest be maintained and that the radio be convenient to operate. It is still another aspect of the invention that a reliable source of energy be provided to operate the radio. It is still another aspect of the invention that various modifications will allow adaptation to a variety of commercially available cooler chests.

The invention utilizes space in the lid of commercially available cooler chest that at most serves an insulation function. Major components positioned in the lid include a resonance chamber housing speakers, a radio circuit board with associated controls, a battery pack, a window in the surface of the lid exposing solar panels, and electrical circuitry and controls.

More specifically, the present invention is directed to a cooler chest having a lid with a top, a bottom, front, rear and side walls that combine to define, limit, and describe an open, interior chamber. A radio circuit board is positioned in the chamber and electrically connected to a power source and to at least one speaker. Both the power source and speakers are positioned in the chamber.

Even more specifically, the power source includes a battery pack with batteries and solar panels connected such that the solar panels are the primary source of power and the solar panels may recharge the batteries. In a least one configuration, the power source is either the battery pack or the solar panels, but not both. In configurations employing the solar panels, the solar panels are positioned in a window formed in the top of the cooler lid.

And even more specifically, speakers are disposed in a resonance chamber fashioned from a hollow tube with an inside diameter approximately equal to the diameter of the speakers. The resonance chamber including appropriate wiring to connect the speakers to the radio circuit board is positioned along one side of the chamber. Openings in the opposing end walls are effectively equal to the outside diameter of the tube element of the resonance chamber and the length of the tube allows each end of the tube to engage the wall at the opening. Waterproof sealants are used to secure the tube with the wall with which it is in contact.

Finally, switches and related manual radio controls are enclosed in an open front structure, the walls of which extend into the chamber. The switches and other controls do not extend beyond the outer perimeter of the lid. The open-front structure is positioned by convenience in either side wall or the front or back wall. An antenna wire connected to the radio circuit board circumscribes the interior perimeter of the chamber.

These and other features, aspects, and advantages of the present invention will be more fully understood with reference to the following description, drawings, and appended claims.

BRIEF DESCRIPTION OF THE DRAWINGS

A full and enabling disclosure of the present invention, including the best mode thereof, to one of ordinary skill in the art, is set forth more particularly in the remainder of the specification, including references to the accompanying drawings.

DESCRIPTION OF THE PREFERRED EMBODIMENTS

Reference now will be made in detail to the embodiments of the invention, one or more examples of which are set forth below. Each example is provided by way of explanation and illustration of the invention, not as a limitation. One skilled in the art will recognize that numerous variations and modifications can be made in the present invention without departing from the obvious scope or intention of the invention. For instance, features of various embodiments can be combined to yield additional embodiments. Thus, it is intended that the present invention cover such variations and modifications as come within the scope of the appended claims.

In describing the various figures herein, the same reference numbers are used throughout describe or identify the same part or feature, and to minimize redundancy detailed descriptions of much of the invention once presented in relation to one figure are not routinely repeated in subsequent descriptions of other figures, although the reference number may be shown in a subsequent figure. In the following figures one of average skill in the art will immediately recognize that identification of alternate ends of parts of charges on electrical poles is arbitrary and may be reversed in most instances without affecting the scope, nature, or intent of the invention. Such designations are for reference purposes and convenience only.

Figure 1A:
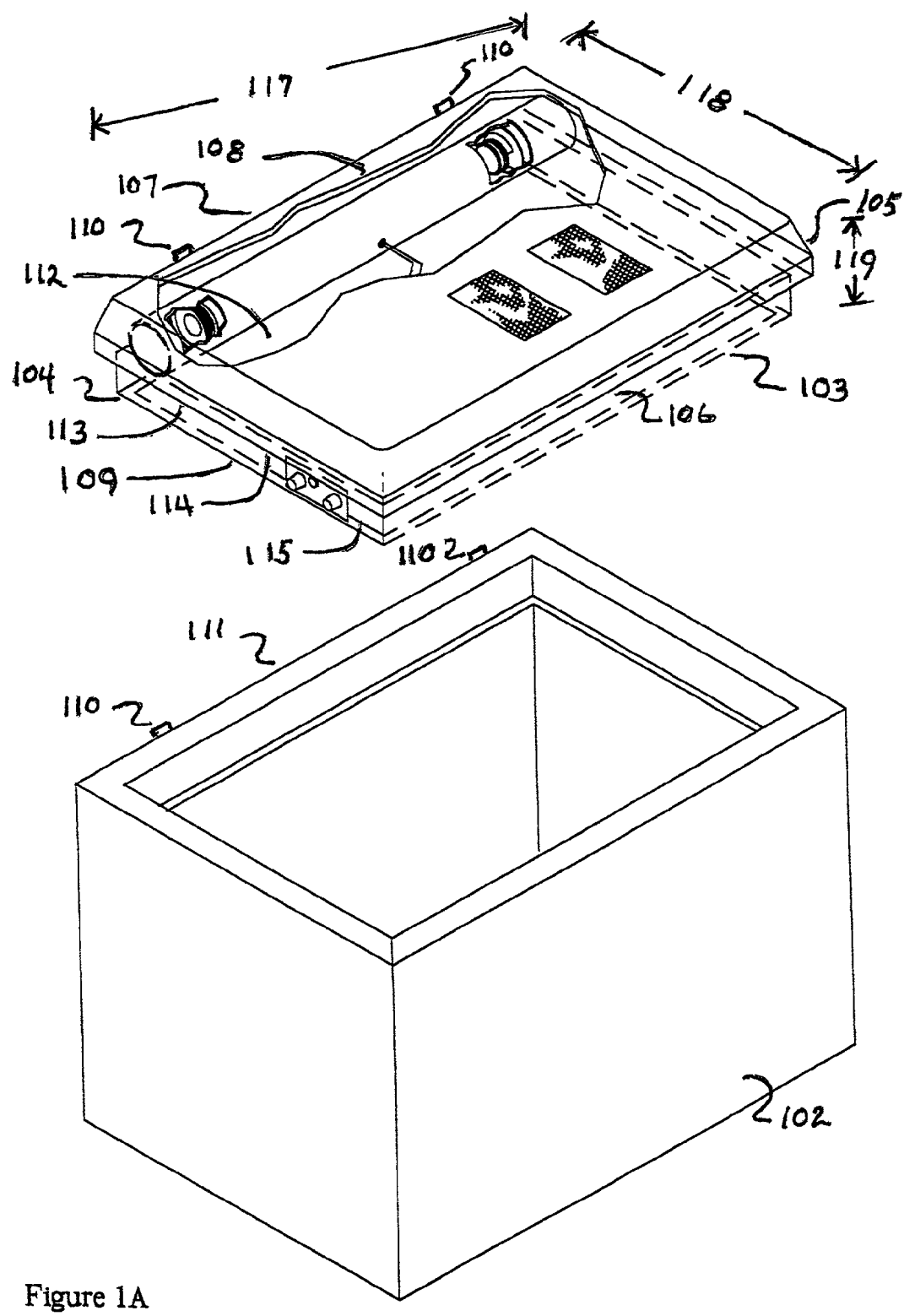
FIGS. 1A and 1B illustrate cooler chests with a flat lid and a peaked lid, respectively either of which styles may be adapted to the present invention.

FIG. 1A illustrates the basic structural units of a commercially available cooler 100 with a chest 102, a rectangular lid 103, with opposing end walls 104 and 105, a front wall 106, a rear wall 107, a top 108, a bottom 109, and hinges 110 that connect the rear wall 107 to the rear wall 111 of the chest 102 allowing the lid to swing upward from a closed position to an open position. The inner surfaces of the end walls 104 and 105, the front wall 106, rear wall 107, top 108, and bottom 109 describe and limit a lid chamber 112. The lower portion of the perimeter 113 of the lid is stepped inward forming a ledge 114 with the wall 115 extending below the ledge 114. When the lid is in the closed position, the surface of the ledge rests on the upper surface 116 of the edge of the chest 102. The majority of the volume of the chamber is determined by the length 117, width 118, and primary height 119 measured from the interior of the top 108 to the interior surface of the ledge 114.

Figure 1B:
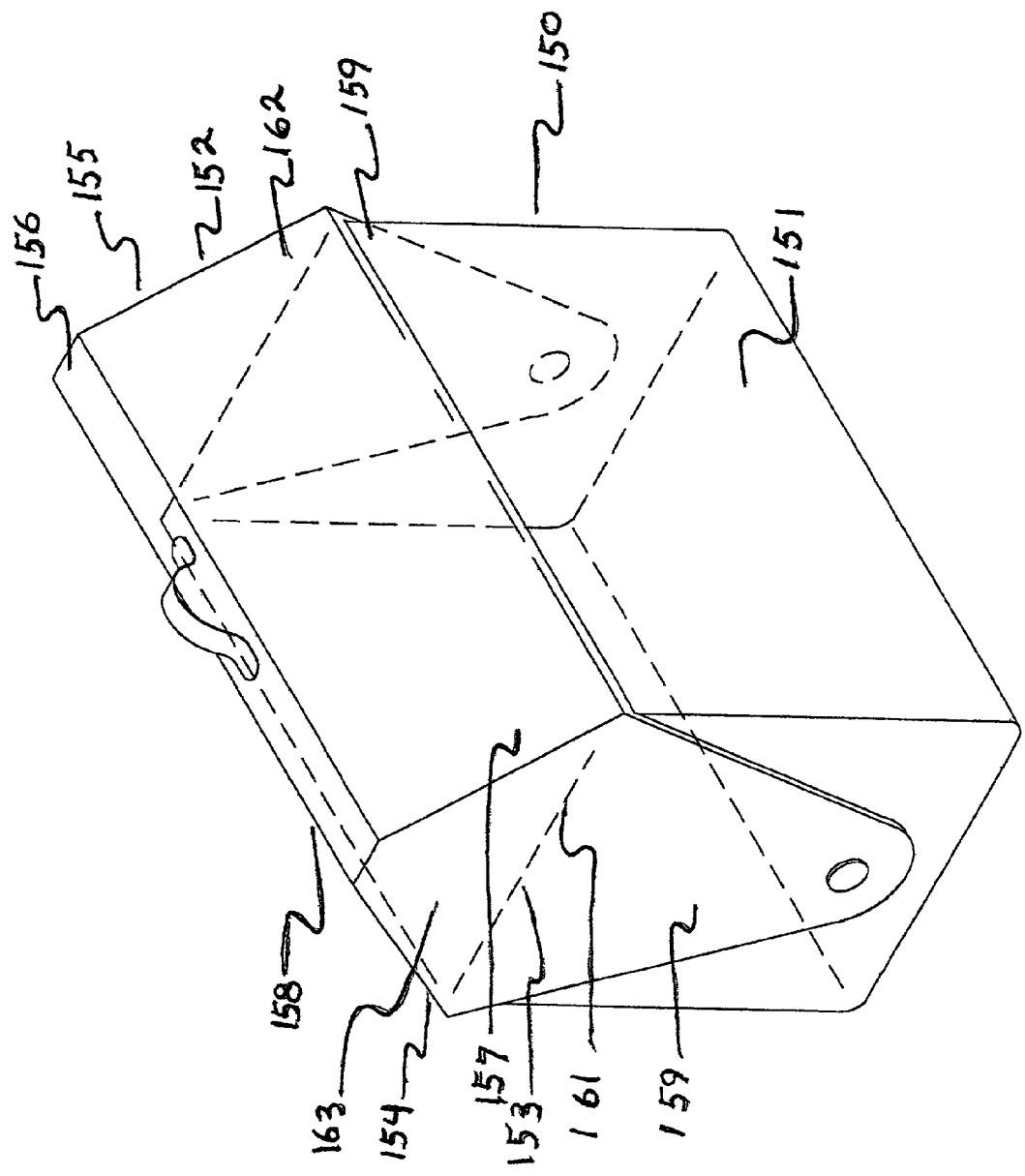

FIG. 1B illustrates basic structural features of an alternative style, commercially available cooler 150 with a rectangular chest 151, a lid 152 having a rectangular base perimeter 153, opposing, triangular ends 154 and 155, a ridge 156, two top panels 157 and 158 and an extension 159 connected to and downward from and part of each triangular end 157 and 158. Pivot pins 160 connect the lid 152 to the chest 151 and allow the lid 152 to pivot to open end expose the interior of the chest 151. The maximum capacity of the chest 151 is limited by the arc through which the lid travels when it is pivoted from an open to a closed position. Commonly this arc is described by the height and shape of the end walls 161 and 162 of the chest. As a result, an area of open space 163 limited by the ridge 156, top panels 157 and 158, and end walls 154 and 155 and the plane defined by the arc of the end walls and extending the length of the lid, is formed in the lid in its closed position. This space is analogous to the chamber 112 described in FIG. 1A, above.

Figure 2:
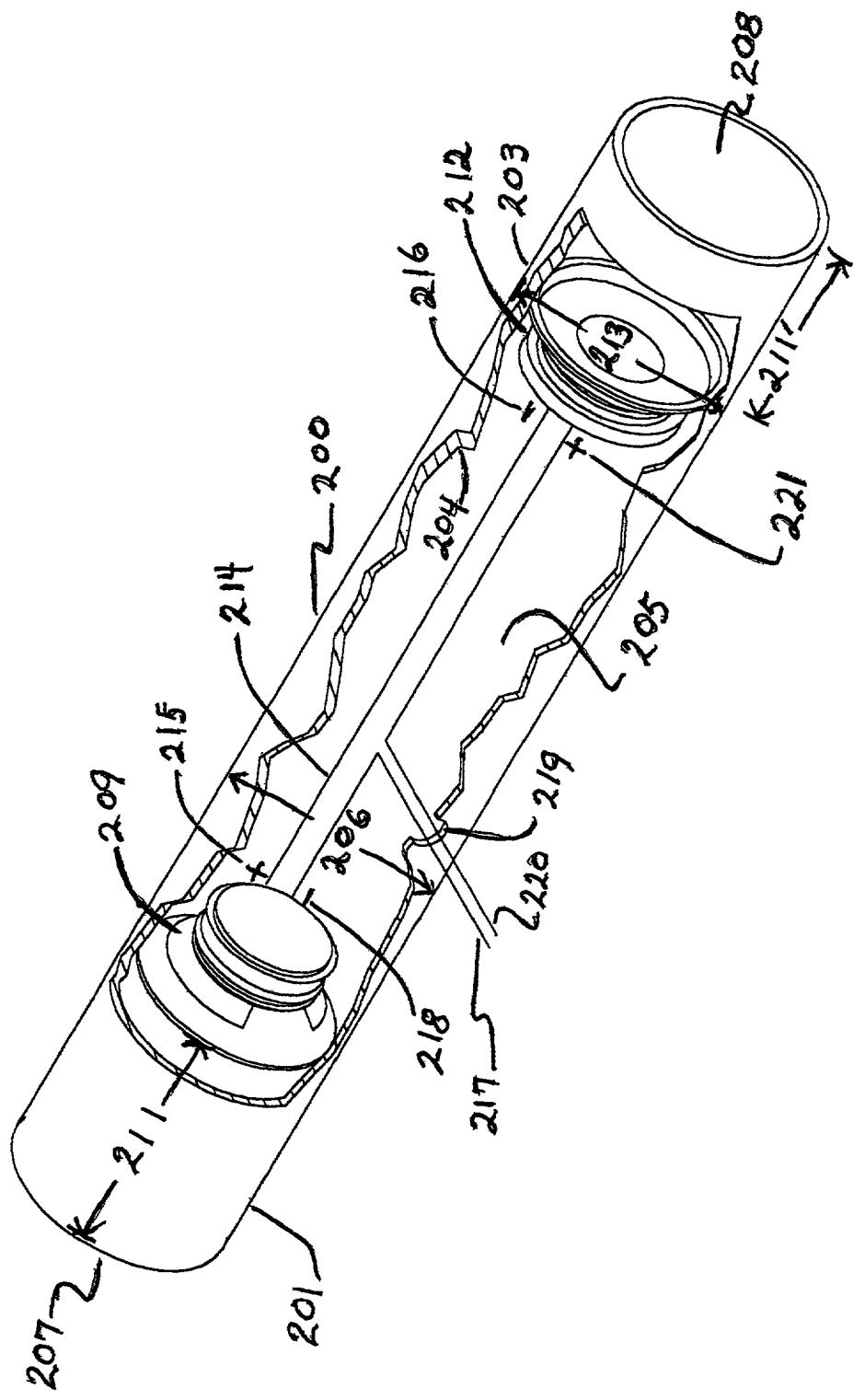
FIG. 2 illustrates a resonance chamber with two speakers and their wiring configuration.

As illustrated in FIG. 2, the resonance chamber 200 comprises a hollow, round tube 201 with a length 202, an outer surface 203, and inner surface 204 that limits and describes the hollow, circular, longitudinal core 205 with an inside diameter 206. The tube 201 has a first end 207 and a second end 208. A first speaker 209 is positioned in the core 205 at a distance 211 from the first end 207. A second speaker 212 is positioned in the core 205 at a distance 211' from the second end 208. The outside diameter 213 of the speakers 209 and 212 is effectively equal to the inside diameter 206 of the core 205. As illustrated in FIG. 2, the speakers are wired in series. One of average skill in the art would recognize that the speakers can be wired in parallel without changing the nature, scope, or purpose of the invention and that the invention reasonably anticipates such parallel wiring. An electrical lead 214 connects the positive pole 215 of the first speaker 209 to the negative pole 216 of the second speaker 212. A second lead 217 is connected to the negative pole 218 of the first speaker 209 and traverses the tube 201 at opening 219. A third lead 220 is connected to the positive pole 221 of the second speaker 212 and also traverses the tube at opening 219.

Figure 3:
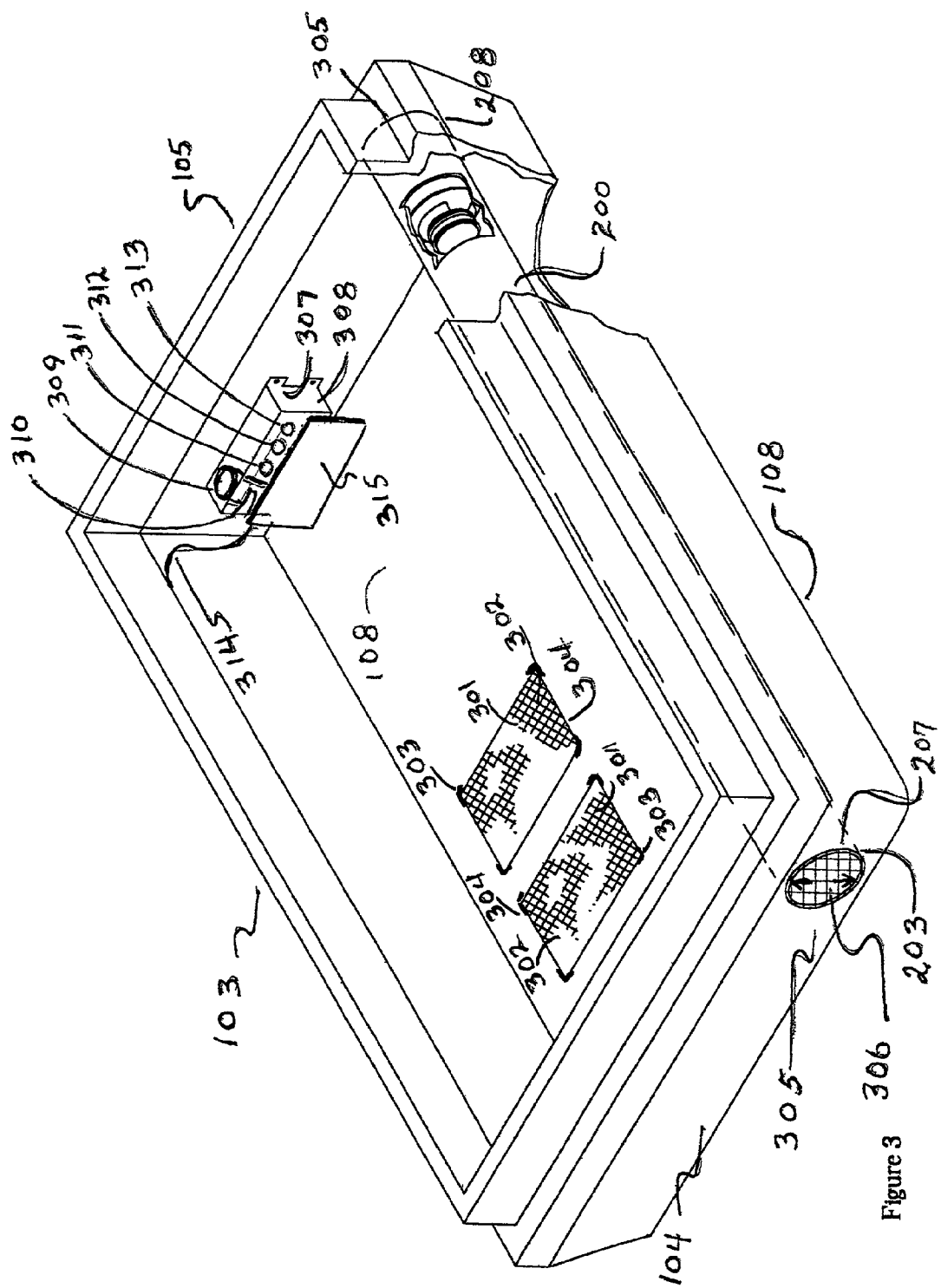
FIG. 3 is a schematic view from the bottom of the lid showing the arrangement of major components of the radio and power sources housed in the lid.

The lid 103 in FIG. 3 is illustrated with the bottom 109 removed and the lid 103 resting on the outer surface of its upper surface 108. Four openings are illustrated in the lid 103. A window 301 in the upper surface 108 provides entry of ambient light to one or more solar panels 302. The solar panels 302 are held in position by brackets 303 secured to the upper surface 108 of the lid 103. A transparent, shatter resistant pane 304 is fitted to the window opening 301 and is secured therein. Two circular openings 305 with a diameter 306 effectively equal to the outer diameter of the tube 203 are formed in each end wall 104 and 105. The resonance chamber 200 is positioned such that the ends 207 and 208 extend into, but do not protrude from openings 305. The length of the resonance chamber 202 as illustrated in FIG. 2 is equal to the length of the lid 301 as illustrated in FIG. 3. A fourth opening 307 is formed in one end wall 104 or 105, and an open faced box structure 308 is positioned with the open side facing out, recessed in the opening. The box structure 308 houses a battery 309 with securing clips 310, the mode selection switch 311, the on/off volume control knob 312, and the frequency selector knob 313. An antenna 314 circumscribes the inner perimeter of the lid and is connected to the radio circuit board 315.

Figure 4:
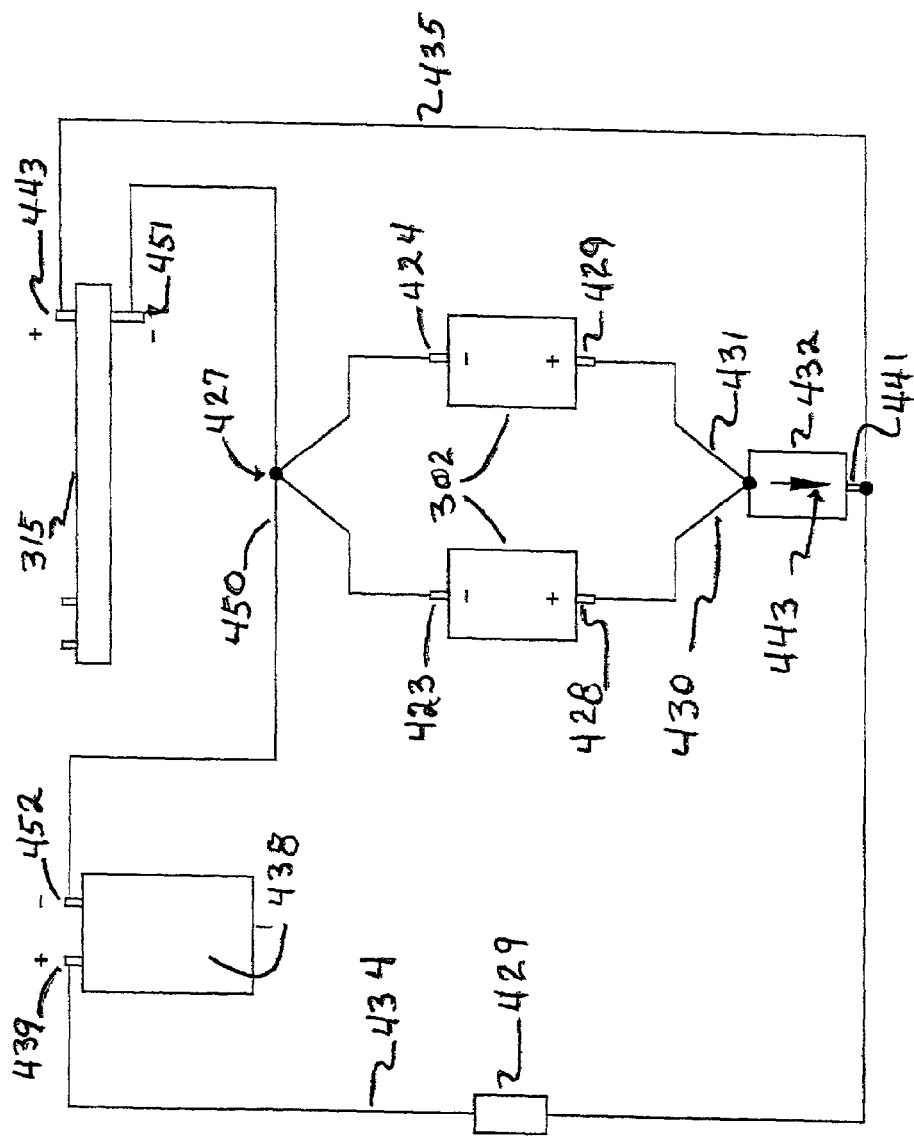
FIG. 4 is a wiring diagram for a radio system with two speakers and a battery charger system.

FIG. 4 provides a detailed wiring diagram of the radio circuit board 315, solar panels 302, PN diode 432, and battery 438. The solar panels are 6 volt panels commercially available (Radio Shack, USA) and wired in parallel. The positive poles 428 and 429 of the solar panels 302 are connected to the PN diode 432 by electrical leads 430 and 431 respectively. Electrical current flows thorough PN diode 432 in the direction of arrow 433. As one skilled in the art will recognize, this prevents flow of current from battery 438 to the solar panels. A single positive lead 441 exits PN diode 432. Lead 434 connects PN diode 432 to the positive pole 439 of battery 438. Lead 435 connects positive lead 441 to the positive pole 443 of the radio circuit board 315. The negative poles 423 and 424 of the solar panels are connected to a common point 427. One skilled in the art will recognize that this wiring arrangement will allow solar energy to recharge suitable types of rechargeable batteries. A voltage regulator 429 may be wired between the solar panels 302 and battery 309. Lead 450 connects negative terminal 452 of battery 438 through point 427 to the negative pole 451 of the radio circuit board 315.

DESCRIPTION OF THE PREFERRED EMBODIMENT

EXAMPLE 1

A preferred embodiment utilized a cooler chest having a rectangular lid with a flat surface and a hollow chamber as described in FIG. 1A. Outside dimensions of the lid of a commercially available cooler with this type of lid varied from a length of less than 60 cm (24 in) to over 120 cm (48 in), a width of less than 34 cm (13.25 in) to over 70 cm (27 in) and a primary height of less than 9.5 cm (4 in) to over 18 cm (8 in). The maximum diameter of the resonance chamber was determined by the primary height, and the maximum diameter of speakers was determined by the inside diameter of the resonance chamber. Within practical limits, sound quality improves with the size of speakers, thus maximum sizes of commercially available components and materials are used with in the limits set by the dimensions of the lid.

The inside length of the lid of a commercially available 54 quart capacity cooler was approximately 60 cm (24 in) and the primary height 9.5 cm (4 in). The primary height limited the diameter of the resonance tube to less than 9.5 cm (4 in). The tube element of the resonance chamber was made from light weight, residential PVC plumbing pipe which was commercially available from retail suppliers. A suitable tube was a length of light weight PVC pipe approximately 60 cm (24 in) in length with an outside diameter of approximately 8 cm (3 in) and an inside diameter of approximately 7.5 cm (2.9 in). Circular openings were cut in each end wall of the lid with the perimeter as close as practical to the interior surface of the front wall of the lid and the interior, upper surface of the lid. The bottom of the lid was removed as a first step in adapting the lid. The tube was shaped to fit snugly against the openings with each end of the tube contacting the inner wall forming the perimeter of the openings. The completed resonance chamber was positioned in the lid chamber with the ends of the tube contacting the openings and adhesively attached to them with additional adhesive attachment between the tube and the top and side walls. The interface of the end walls and tube was also sealed with a water proof, silicon sealant. A fine mesh screen was positioned over the openings on the outer surface of the lid and cemented in place.

The resonance chamber was completed as follows. Plastic, water proof speakers with a diameter no greater than the inside diameter of the tube were inserted into the tube and fixed in position with commercially available glue. Each speaker was positioned 5 cm (2 in) from the end of the tube. Suitable speakers were 4 ohm, 6 to 9 volt plastic speakers commercially available from various outlets (Motorola Electronics, USA). Prior to insertion, the speakers were wired with the positive pole of one speaker connected to the negative pole of the other. Independent leads were connected to each of the two poles not joined, and these leads were brought through an opening bored in the tube. The opening was sealed with a water proof material, such as a commercially available silicon sealant, and the perimeter of each speaker was also sealed with the silicon sealant.

A rectangular opening was cut in the top of the lid. The dimensions of the opening was determined by the dimensions of solar panels to be positioned in the interior of the opening. The edges of the opening were beveled to receive and support a transparent pane that was secured in the opening with water proof glue and a sealant. The pane was additionally-supported by corner brackets attached to the interior surface of the top at each corner of the window opening to support the pane. Solar panels were positioned to intercept light passed through the window and were supported by corner brackets attached to the interior of the top. Generating capacity of the solar panels was determined by the power of the radio to be installed. A pair of six volt panels available commercially was adequate.

An open front, rectangular box was positioned in an opening made in one end wall of the lid. The box was sealed around its perimeter with a silicon sealant and extended inward into the chamber of the lid. The box included a protective cover for a battery pack with connections for an enclosed battery and the switching devices for radio functions (modulation selection (AM/FM), on/off and volume control, and frequency selection or tuning controls passed through the rear wall of the box. All openings through which these controls pass through the rear wall of the box were water proof by a combination of the use of water proof sealants and by o-rings positioned on the control shafts positioned to compress against the structural face of the box. The controls was connected directly to a commercially available radio circuit board. None of the control devices extended beyond the edge of the box which was flush with the outer surface of the end wall in which the box was positioned. One edge of the circuit board was glued to the inner surface of the top of the lid and the edges of the board or secured with vertical supports that were connected to a side wall and to the top of the lid. An antenna wire was connected to the radio circuit board and extended fully around the inner perimeter of the lid. One skilled in the art will recognize that the resonance chamber and open front box could be molded into the lid without changing the scope or intent of the invention and such molding is anticipated by the invention.

The solar panels provided the primary power source to operate the radio. As illustrated in FIG. 4, the two 6-volt solar panels were wired in parallel with power to the radio and power passing through a voltage regulator to rechargeable batteries. The positive leads from the solar panels was joined as a single lead and connected to a PN diode which regulated electrical flow unidirectionally from the solar panels. FIG. 4 illustrates the the speakers wired in series. One skilled in the art will recognize that the speakers could be wired in parallel without changing the scope or intent of the invention. All wiring was with 20 gauge, insulated wire, and all connections were water proofed with application of an appropriate sealant, such as silicon.

One skilled in the art will immediately recognize that wiring will be simplified with the use of a single solar panel of adequate generation capacity and that such a modification does not change the nature, scope or intent of the invention. Similarly, one skilled in the art will recognize that the battery can be recharged without inclusion of the voltage control device illustrated without changing the nature, scope, or intent of the invention. The 6 volt solar panel system will not over charge a nine volt battery. Further, one of average skill in the art will also recognize that the system can be powered exclusively by solar panels. In this configuration the battery charger, voltage regulator, and PN diode are eliminated and the wiring scheme preportionately simplified. Similarly, the components can be wired in series or parallel without altering the scope or intent of the invention.

Finally, to ensure the insulation capacity associated by the hollow lid and to improve overall moisture resistance and protection of the wiring, radio receiver unit, solar panels, battery, and resonance tube, when all components were positioned and secured, the hollow core of the lid was covered with a thick coating of water proof protective plastic foam. As a last step, the bottom of the lid was replaced and sealed.

EXAMPLE 2

An alternate embodiment utilizes the coolers with lids shaped as described by FIG. 1B. In this embodiment, the resonance chamber is positioned longitudinally along the ridge. Depending on specific size considerations, windows for the solar panels may be positioned in both roof panels, and the open front box with batteries and controls positioned in a top panel or an end of the lid. The circuit board is also secured to a top panel by means of brackets to which the circuit board is attached. The basic design of the resonance chamber, wiring, and controls are unchanged from the Example 1.

EXAMPLE 3

An additional embodiment utilizes a cooler with a circular lid with a hollows chamber as described in FIG. 1A. One of average skill in the art recognizes that the resonance chamber can be readily positioned on any diameter line of the lid. Ends of the tube would require minimal additional fitting to fit the curve of the lid. In addition, the open face box as well as the windows may be positioned on the flat top of the lid.

EXAMPLE 4

At least two variations of the resonance chamber are appropriate, most commonly to larger coolers. These adaptations allow positioning three or four speakers in a modified chamber. For three speakers, the tube assumes the shape of a "T" or "Y" with three ends or openings, and for four speakers an "X" shape describes the tube. Three- and four-way plastic couplers are available to fabricate such chambers. Resonance tubes with three or four speakers generally will be positioned in coolers with circular lids or coolers with relative large rectangular lids. The addition of speakers may require greater power producing capacity. One of average skill in the art, with minimal experimentation could determine power requirements for both solar panels and batteries.

Although preferred embodiments of the invention have been described using specific terms, devices, and methods, such terms, devices, and methods are for illustrative purposes only. The terms, devices, and methods are terms of description, not of limitation. It is understood that numerous changes and variations may be made by those of ordinary skill in the art without departing from the spirit or scope of the present invention, which is set forth in the following claims.

What is claimed is:

1. A resonance chamber comprising:
   a. a tube with at least a first end, a second end, a length, an outer diameter, an inner diameter, an outer wall, an inner wall, and a longitudinal inner core defined by said inner wall; and
   b. at least two speakers positioned in said longitudinal inner core of said tube, said speakers being in functional communication with a radio circuit board and with each other.

2. The resonance chamber of claim 1 wherein said tube has two ends and further wherein two speakers are positioned in said tube.

3. The resonance chamber of claim 1 wherein said tube comprises three ends and further wherein three speakers are positioned in said tube near each of said three ends.

4. The resonance chamber of claim 1 wherein said tube has at least four ends and a speaker is positioned near each of the said at least ends.

* * * * *